United States Patent
Nishi et al.

(10) Patent No.: US 11,716,552 B2
(45) Date of Patent: Aug. 1, 2023

(54) IMAGING CONTROL DEVICE, IMAGING CONTROL METHOD, AND IMAGING DEVICE FOR INCREASING RESOLUTION OF AN IMAGE

(71) Applicant: SONY GROUP CORPORATION, Tokyo (JP)

(72) Inventors: Tomohiro Nishi, Tokyo (JP); Hideyuki Ichihashi, Tokyo (JP); Masatoshi Yokokawa, Tokyo (JP); Yiwen Zhu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/630,479

(22) PCT Filed: May 26, 2020

(86) PCT No.: PCT/JP2020/020716
§ 371 (c)(1),
(2) Date: Jan. 26, 2022

(87) PCT Pub. No.: WO2021/024577
PCT Pub. Date: Feb. 11, 2021

(65) Prior Publication Data
US 2022/0256105 A1    Aug. 11, 2022

(30) Foreign Application Priority Data
Aug. 6, 2019 (JP) .............................. JP2019-144316

(51) Int. Cl.
*H04N 25/704* (2023.01)
*H04N 23/68* (2023.01)
(Continued)

(52) U.S. Cl.
CPC ......... *H04N 25/704* (2023.01); *H04N 23/687* (2023.01); *H04N 23/951* (2023.01);
(Continued)

(58) Field of Classification Search
CPC ......... H04N 5/23212; H04N 5/232122; H04N 5/23232; H04N 5/23287; H04N 5/347;
(Continued)

(56) References Cited

U.S. PATENT DOCUMENTS

| 2011/0129167 A1 | 6/2011 | Nojima et al. |
| 2017/0111566 A1* | 4/2017 | Nemoto .................... G06T 7/20 |
| 2017/0353680 A1* | 12/2017 | Fukuda .............. H04N 5/23212 |

FOREIGN PATENT DOCUMENTS

| JP | 2013-225724 A | 10/2013 |
| JP | 2014-089260 A | 5/2014 |

(Continued)

OTHER PUBLICATIONS

International Search Report and Written Opinion of PCT Application No. PCT/JP2020/020716, dated Aug. 11, 2020, 09 pages of ISRWO.

*Primary Examiner* — Paul M Berardesca
(74) *Attorney, Agent, or Firm* — Chip Law Group

(57) ABSTRACT

An imaging element of an imaging unit 24 divides the exit pupil of an imaging optical system 21 into a plurality of regions and generates a pixel signal for each region. An optical axis position adjustment unit 23 adjusts the optical axis position of the imaging optical system with respect to the imaging element. A control unit 26 calculates a parallax on the basis of the pixel signal for each region after the pupil division and performs focus control of the imaging optical system 21. The control unit 26 also moves the optical axis position using the optical axis position adjustment unit 23, and generates, using the imaging element, pixel signals
(Continued)

indicating the same subject region in the plurality of regions after the pupil division. An image processing unit 25 performs binning of a plurality of pixel signals indicating the same subject region generated by moving the optical axis position to generate a high-resolution captured image. Calculation of the parallax and acquisition of a high-resolution captured image can be performed.

12 Claims, 11 Drawing Sheets

(51) Int. Cl.
    *H04N 23/951*     (2023.01)
    *H04N 25/48*     (2023.01)
    *H04N 25/13*     (2023.01)

(52) U.S. Cl.
    CPC ......... *H04N 25/48* (2023.01); *H04N 23/6812* (2023.01); *H04N 25/134* (2023.01)

(58) Field of Classification Search
    CPC .. H04N 5/349; H04N 5/3696; H04N 5/36961; G03B 2205/00–0084; G03B 13/36; G02B 7/28–40; G06T 3/4053; H01L 27/14627
    See application file for complete search history.

(56) References Cited

FOREIGN PATENT DOCUMENTS

| | | |
|---|---|---|
| JP | 2014-093646 A | 5/2014 |
| JP | 2015-119416 A | 6/2015 |
| WO | 2009/150696 A1 | 12/2009 |

\* cited by examiner

|  | ALIGNMENT POSITION | | | |
|---|---|---|---|---|
|  | P1 | P2 | P3 | P4 |
| P1 | INITIAL POSITION | ← | ↑ | ↖ |
| P2 | → | INITIAL POSITION | ↗ | ↑ |
| P3 | ↓ | ↙ | INITIAL POSITION | ← |
| P4 | ↘ | ↓ | → | INITIAL POSITION |

Fig. 5A

| ↖ | ↑ | ↗ |
|---|---|---|
| ← | INITIAL POSITION | → |
| ↙ | ↓ | ↘ |

Fig. 5B

IMAGING CONTROL DEVICE, IMAGING CONTROL METHOD, AND IMAGING DEVICE FOR INCREASING RESOLUTION OF AN IMAGE

CROSS REFERENCE TO RELATED APPLICATIONS

This application is a U.S. National Phase of International Patent Application No PCT/JP2020/020716 filed on May 26, 2020, which claims priority benefit of Japanese Patent Application No. JP 2019-144316 filed in the Japan Patent Office on Aug. 6, 2019. Each of the above-referenced applications is hereby incorporated herein by reference in its entirety.

TECHNICAL FIELD

The present technology relates to an imaging control device, an imaging control method, a program, and an imaging device and makes it possible to calculate parallax and acquire high-resolution captured images.

BACKGROUND ART

Conventionally, an imaging device that performs focus detection using a pupil division method has been disclosed. For example, in PTL 1, a photographing optical system including a photographing lens and a pupil dividing means of the photographing lens is used, light having passed through different pupils of the photographing lens is received by light receiving elements arranged in two dimensions, and the parallax (defocus amount) is calculated on the basis of pixel signals from the light receiving elements corresponding to the light having passed through different pupils.

CITATION LIST

Patent Literature

[PTL 1]
JP 2014-89260 A

SUMMARY

Technical Problem

By the way, in an imaging device using the photographing optical system including the pupil dividing means, the pixel signals output from the light receiving elements according to the reception of light having passed through different pupils of the photographing lens are added to generate the signal of one pixel. Therefore, it is not possible to obtain a captured image having a high spatial resolution.

Therefore, an object of the present technology to provide an imaging control device, an imaging control method, a program, and an imaging device capable of calculating parallax and acquiring high-resolution captured images.

Solution to Problem

A first aspect of the present technology is an imaging control device including: a control unit that causes an optical axis position adjustment unit to move an optical axis position of an imaging optical system with respect to an imaging element that divides an exit pupil of the imaging optical system into a plurality of regions to generate a pixel signal for each region to cause the imaging element to generate pixel signals indicating the same subject region for each of the plurality of regions; and an image processing unit that performs binning of a plurality of pixel signals indicating the same subject region generated by the imaging element moving the optical axis position.

In the present technology, an imaging device that divides the exit pupil of the imaging optical system into 2×2 regions, for example, to generate a pixel signal for each region is used. Further, a color filter having a predetermined color pattern is used as the imaging element, and the pupil-divided 2×2 region has the same color.

The control unit causes the optical axis position adjustment unit that adjust the optical axis position of the imaging optical system with respect to the imaging element to move the optical axis position with respect to an initial position by one pixel. For example, the control unit causes the optical axis position adjustment unit to move the imaging element in a direction orthogonal to the optical axis or causes the optical axis position adjustment unit to drive a shake correction lens to adjust the optical axis position. The control unit causes the imaging element to generate pixel signals indicating the same subject region for each of the 2×2 regions by performing imaging at the initial position and positions moved from the initial position by one pixel in up/down and left/right directions and four diagonal directions. The control unit controls the optical axis position adjusting unit on the basis of movement of an imaging device body having the imaging element detected by a motion detecting unit to correct blurring of a captured image.

The image processing unit performs binning in the time direction using a plurality of pixel signals indicating the same subject region generated by moving the position of the optical axis. The image processing unit discriminates a flat region using the pixel signals generated by the imaging element, and a pixel signal generated by performing binning in a spatial direction using the pixel signals of the pupil-divided regions is used in the flat region instead of the pixel signals generated by the binning in the time direction. The image processing unit discriminates a moving subject using the pixel signals generated by the imaging element, and a pixel signal generated by binning a plurality of pixel signals indicating the same subject region is used in a region determined to be not the moving subject.

A second aspect of the present technology is an imaging control method including: allowing a control unit to cause an optical axis position adjustment unit to move an optical axis position of an imaging optical system with respect to an imaging element that divides an exit pupil of the imaging optical system into a plurality of regions to generate a pixel signal for each region to cause the imaging element to generate pixel signals indicating the same subject region for each of the plurality of regions; and allowing an image processing unit to perform binning of a plurality of pixel signals indicating the same subject region generated moving the optical axis position.

A third aspect of the present technology is a program for causing a computer to execute imaging control using an imaging element that divides an exit pupil of an imaging optical system into a plurality of regions to generate a pixel signal for each region, the computer executing: causing an optical axis position adjustment unit to move an optical axis position of the imaging optical system with respect to the imaging element and causing the imaging element to generate pixel signals indicating the same subject region for each of the plurality of regions; and performing binning of a plurality of pixel signals indicating the same subject region generated by moving the optical axis position.

A fourth aspect of the present technology is an imaging device including: an imaging element that divides an exit pupil of an imaging optical system into a plurality of regions to generate a pixel signal for each region; an optical axis position adjustment unit that adjusts an optical axis position of the imaging optical system with respect to the imaging element; a control unit that causes the optical axis position adjustment unit to move the optical axis position and causes the imaging element to generate pixel signals indicating the same subject region for each of the plurality of regions; and an image processing unit that performs binning of a plurality of pixel signals indicating the same subject region generated by moving the optical axis position.

BRIEF DESCRIPTION OF DRAWINGS

FIG. 5 is a diagram showing an optical axis position moving direction for generating pixel signals of the same subject region.

DESCRIPTION OF EMBODIMENTS

Figures 1A, 1B:
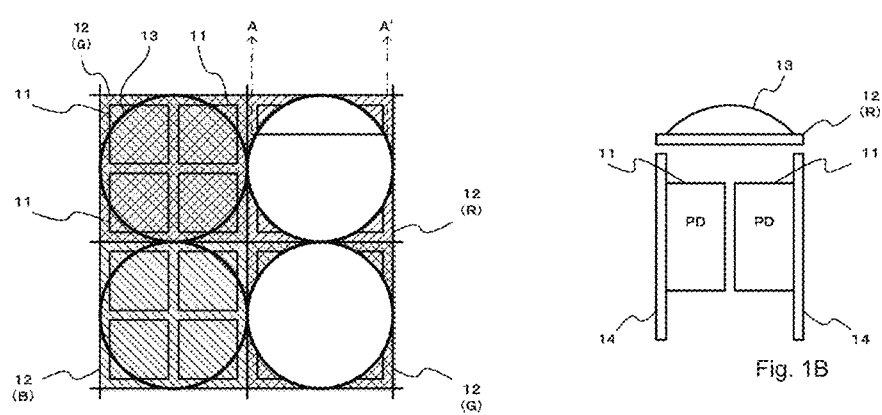
FIGS. 1A and 1B are diagrams showing a part of a configuration of an imaging element.

Hereinafter, embodiments of the present technology will be described. The description will be given in the following order.
1. Present Technology
2. First Embodiment
2-1. Configuration of First Embodiment
2-2. Operation of First Embodiment
3. Second Embodiment
3-1. Configuration of Second Embodiment
3-2. Operation of Second Embodiment
4. Other Embodiments
5. Application Examples
   <1. Present Technology>
In the imaging device of the present technology, an imaging element that divides an exit pupil of an imaging optical system into a plurality of regions and generates a pixel signal for each region so that parallax (also referred to as "defocus amount") can be calculated is used. FIGS. 1A and 1B shows a part of a configuration of an imaging element. As shown in FIG. 1A, an imaging element 10 is provided with a color filter 12 and an on-chip lens 13 on the incident side of pixels 11 arranged two-dimensionally.

In the color filter 12, for example, the color regions of the three primary colors of R (red), G (green), and B (blue) are arranged in the Bayer arrangement, and the on-chip lens 13 is provided in each color region of the color filter 12. Further, a plurality of photoelectric conversion elements (PD) are provided in each color region of the color filter 12, and a plurality of pixels are provided under the on-chip lens 13. For example, in FIG. 1A, 2×2 pixels are provided under the on-chip lens 13. FIG. 1B shows a schematic cross-sectional view of the A-A' position in FIG. 1A. The pixel 11 is composed of a photoelectric conversion element (PD) and a circuit unit (not shown) for reading and discarding the electric charge accumulated in the photoelectric conversion element, and is provided with a separation layer 14 as a boundary between a pixel block of 2×2 pixels and another pixel block.

The imaging element uses the imaging element configured in this way to calculate a phase difference between a signal obtained by reading a pixel signal at a predetermined pixel position in the pixel block under the on-chip lens 13 from each pixel block and a signal obtained by reading a pixel signal at another pixel position in the pixel block from each pixel block as a defocus amount and performs focus control so that the defocus amount is minimized.

In the imaging device of the present technology, imaging is performed while sequentially moving the optical axis position of the imaging optical system with respect to the imaging element so that pixel signals indicating the same subject region can be generated by a plurality of pixels under the on-chip lens, binning of pixel signals indicating the same subject region is performed for each pixels using imaging signals obtained in chronological order to acquire a high-resolution captured image. Binning is also called pixel mixing, and is a process of adding and averaging the pixel signals of a plurality of pixels.

2. First Embodiment

In the first embodiment, a case where the imaging device is fixed to a stationary object or the like and does not move will be described.

2-1. Configuration of First Embodiment

Figure 2:
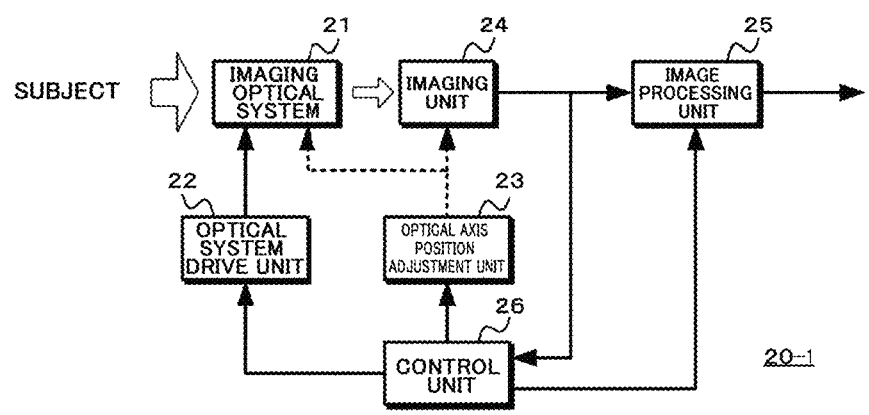
FIG. 2 is a diagram showing a configuration of a first embodiment.

FIG. 2 shows the configuration of the first embodiment. An imaging device 20-1 includes an imaging optical system 21, an optical system drive unit 22, an optical axis position adjustment unit 23, an imaging unit 24, an image processing unit 25, and a control unit 26.

The imaging optical system 21 is configured using a focus lens, a zoom lens, or the like. The imaging optical system 21 drives a focus lens, a zoom lens, or the like on the basis of a drive signal from the optical system drive unit 22, and forms a subject optical image on the imaging surface of the imaging unit 24. The imaging optical system 21 may be provided with an iris (aperture) mechanism, a shutter mechanism, or the like, and may be configured to drive each mechanism on the basis of a drive signal from the optical system drive unit 22. The imaging optical system 21 may be detachable or fixed.

The optical system drive unit 22 generates a drive signal on the basis of the focus control signal and the zoom control signal supplied from the control unit 26 and outputs the drive signal to the imaging optical system 21 to perform a focus lens driving operation of focusing on a desired subject and a zoom lens driving operation so that a captured image with a desired angle of view is obtained.

The optical axis position adjustment unit 23 is configured using an optical shake correction mechanism, and adjust the position of the optical axis of the imaging optical system 21 with respect to the imaging element of the imaging unit 24 on the basis of an optical axis position adjustment signal from the control unit 26. For example, the optical axis position adjustment unit 28 moves a shake correction lens provided in the imaging optical system 21 on the basis of the optical axis position adjustment signal, or moves the imaging element of the imaging unit 24 in a direction orthogonal to the optical axis on the basis of the optical axis position adjustment signal to adjust the optical axis position of the optical axis of the imaging optical system with respect to the imaging element.

The imaging unit 24 is configured using an imaging element such as a complementary metal oxide semiconductor (CMOS) or a charge coupled device (CCD). The imaging device has the configuration shown in FIGS. 1A and 1B, and generates an imaging signal and outputs the imaging signal to the image processing unit 25 and the control unit 26.

The image processing unit 25 discriminates pixel signals indicating the same subject region from the imaging signals generated in chronological order by the imaging unit 24 on the basis of an identification signal from the control unit 26, performs binning of the pixel signals indicating the same subject region for each pixel, and outputs an image signal of the captured image composed of the pixel signals after binning.

The control unit 26 calculates the defocus amount on the basis of the imaging signal generated by the imaging unit 24. The control unit 26 generates a focus control signal so that the defocus amount is minimized on the basis of the calculated defocus amount, and outputs the focus control signal to the optical system drive unit 22 to perform focus control so that a desired subject is in focus.

The control unit 26 outputs an optical axis position adjustment signal to the optical axis position adjustment unit 23 to perform adjustment of the optical axis position of the imaging optical system 21 with respect to the imaging element so that pixel signals indicating the same subject region can be generated in all the pixels or a plurality of pixels corresponding to the regions obtained by dividing the exit pupil of the imaging optical system 21. The control unit 26 controls the imaging unit 24 to generate an imaging signal every time the optical axis position adjustment process is performed. The control unit 26 outputs an identification signal to the image processing unit 25, which makes it possible to determine whether the pixel signals indicating the same subject region are generated in any one of the pixels corresponding to the pupil-divided regions.

2-2. Operation of First Embodiment

Figure 3:
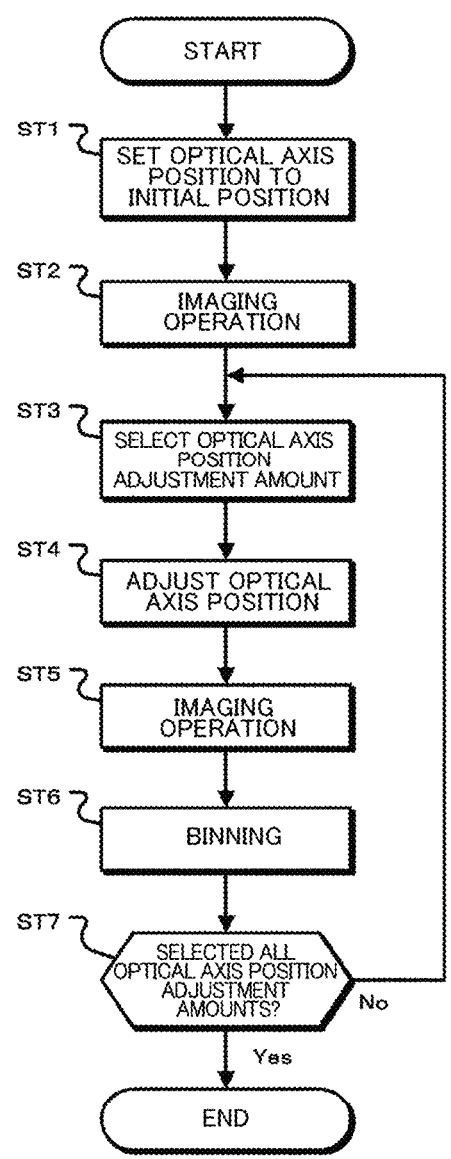
FIG. 3 is a flowchart showing an operation of the first embodiment.

FIG. 3 is a flowchart showing the operation of the first embodiment. FIG. 3 shows an operation in a state where focus control is performed on the basis of an imaging signal generated by the imaging unit 24 and a desired subject is in focus.

In step ST1, the imaging device sets the optical axis position to an initial position. The control unit 26 of the imaging device 20-1 sets the optical axis position to the initial position with the aid of the optical axis position adjustment unit 23, and proceeds to step ST2.

In step ST2, the imaging device performs an imaging operation. The control unit 26 of the imaging device 20-1 controls the imaging unit 24 to perform an imaging operation and output an imaging signal when the optical axis position is the initial position to the image processing unit 25, and proceeds to step ST3.

In step ST3, the imaging device selects an optical axis position adjustment amount. The control unit 26 of the imaging device 20-1 selects an optical axis position adjustment amount that has not been selected from a plurality of preset optical axis position adjustment amounts, or selects an optical axis position adjustment amount in a specified order, and proceeds to step ST4.

In step ST4, the imaging device adjusts the optical axis position. The control unit 26 of the imaging device 20-1 moves the optical axis position of the imaging unit 24 with respect to the imaging element with the aid of the optical axis position adjustment unit 23 on the basis of the optical axis position adjustment amount set in step ST3, and proceeds to step ST5.

In step ST5, the imaging device performs an imaging operation. After the optical axis position adjustment in step ST4 is completed, the control unit 26 of the imaging device 20-1 controls the imaging unit 24 to perform the imaging operation and output the imaging signal generated by the imaging unit 24 to the image processing unit 25 and proceeds to step ST6.

In step ST6, the imaging device performs binning. The control unit 26 of the imaging device 20-1 outputs an identification signal to the image processing unit 25, the identification signal making it possible to determine whether the pixel signals indicating the same subject region are generated in any one of the pixels corresponding to the pupil-divided regions with respect to the imaging signal when the optical axis position is the initial position. The image processing unit 25 performs binning of the pixel signals indicating the same subject region for each pixel on the basis of the identification signal from the control unit 26 using the imaging signal generated in step ST5 or the imaging signal already generated or the imaging signal generated in the previous binning, and proceeds to step ST7.

In step ST7, the imaging device determines whether all the optical axis position adjustment amounts have been selected. The control unit 26 of the imaging device 20-1 ends the process when all of the plurality of preset optical axis position adjustment amounts are selected, and returns to step ST3 when there is an unselected optical axis position adjustment amount.

Figures 4A, 4B, 4C, 4D:
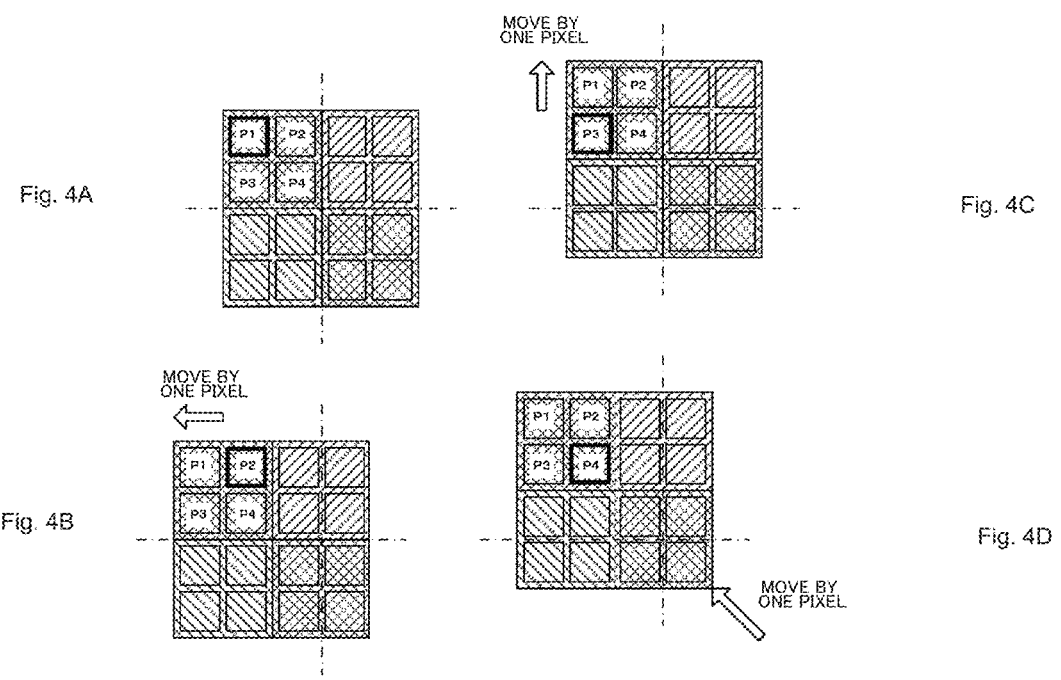
FIGS. 4A, 4B, 4C, and 4D are diagrams showing an operation example of the first embodiment.

FIGS. 4A, 4B, 4C, and 4D shows an operation example of the first embodiment. FIG. 4A shows an optical axis position adjustment amount when the pixels under the on-chip lens are 2×2 pixels. For example, in order for the pixel P2 to generate a pixel signal of the same subject region as the subject region indicated by the pixel signal of the pixel P1, the imaging element 10 may be moved to the left by one pixel (the axis position may be moved to the right by one pixel) as shown in FIG. 4B. In order to for the pixel P3 to generate a pixel signal of the same subject region as the subject region indicated by the pixel signal of the pixel P1, the imaging element 10 may be moved up by one pixel (the optical axis position may be moved down by one pixel) as shown in FIG. 4C. In order for the pixel P4 to generate a pixel signal of the same subject region, the imaging element 10 may be moved to the upper left by one pixel (the optical axis position may be moved to the lower right by one pixel) as shown in FIG. 4D.

Similarly, for the other pixels P2 to P4, the pixel signal of the same subject region can be generated by another pixel by moving the imaging element. FIGS. 5A and 5B shows the optical axis position moving direction for generating pixel signals of the same subject region. FIG. 5A shows an optical axis position moving direction for the other pixels to generate the pixel signals of the same subject region as the subject region indicated by the pixel signals obtained at the initial positions of the pixels P1 to P4. The pixels that generate pixel signals of the same subject region are referred to as pixels at alignment positions. For example, in order for the pixel P2 to generate a pixel signal of the same subject region as the subject region indicated by the pixel signal obtained when the pixel P1 is at the initial position, the optical axis position is moved to the left by one pixel. The optical axis position is moved up by one pixel for the pixel P3 to generate the same, and the optical axis position is moved to the upper left by one pixel for the pixel P4 to generate the same.

In order for the pixel P1 to generate a pixel signal of the same subject region as the subject region indicated by the pixel signal obtained when the pixel P2 is at the initial position, the optical axis position of one pixel is moved to the right by one pixel. The optical axis position is moved to the upper right by one pixel for the pixel P3 to generate the same, and the optical axis position is moved up by one pixel for the pixel P4 to generate the same. In order for the pixel P1 to generate a pixel signal of the same subject region as the subject region indicated by the pixel signal obtained when the pixel P3 is at the initial position, the optical axis position is moved down by one pixel. The optical axis position is moved to the lower left by one pixel for the pixel P2 to generate the same, and the optical axis position is moved to the left by one pixel for the pixel P4 to generate the same. In order for the pixel P1 to generate a pixel signal of the same subject region as the subject region indicated by the pixel signal obtained when the pixel P4 is at the initial position, the optical axis position is moved to the lower right by one pixel. The optical axis position is moved down by one pixel for the pixel P2 to generate the same, and the optical axis position is moved to the right by one pixel for the pixel P3 to generate the same.

That is, in order to generate pixel signals of the same subject region with other pixels for the pixels P1 to P4, if imaging is performed at the initial position and the optical axis movement positions in the eight directions shown in FIG. 5B to generate an imaging signal, the pixel signals of the same subject region as the initial position generated by the other pixels for the pixels P1 to P4 are included in any one of the imaging signals obtained by nine imaging operations.

The control unit 26 sets the optical axis position adjustment amounts corresponding to the optical axis movement positions, selects an optical axis position adjustment amount from the set optical axis position adjustment amounts, and performs adjustment of the optical axis position so that imaging is performed at the initial position and the optical axis movement positions in the eight directions shown in FIG. 5B.

Figures 6A, 6B:
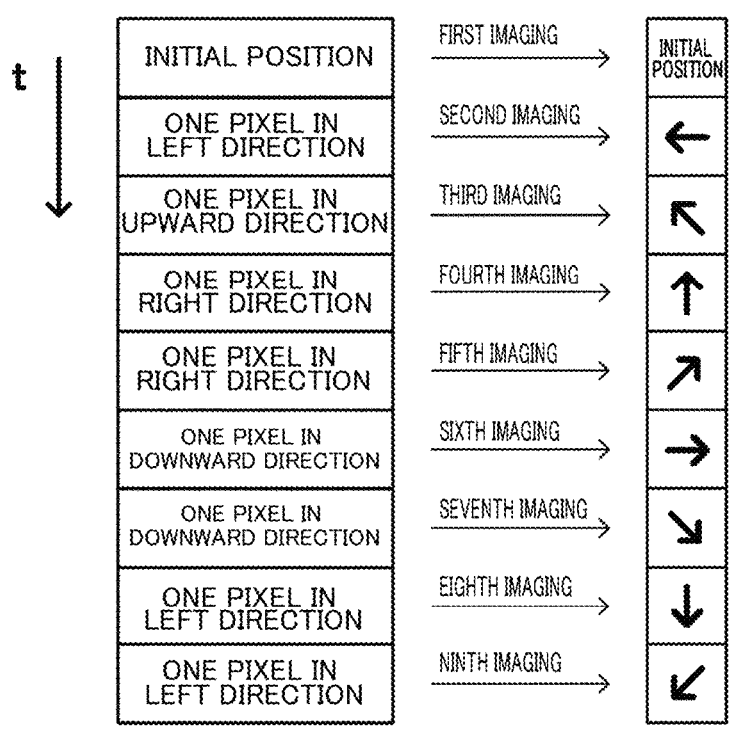
FIGS. 6A and 6B are diagrams showing an optical axis position adjustment amount.

FIGS. 6A and 6B show an optical axis position adjustment amount. FIG. 6A shows the optical axis position adjustment amount in the order of selection, and FIG. 6B shows the optical axis position moving direction corresponding to an imaging signal obtained when the optical axis position is adjusted by the selected optical axis position adjustment amount. For example, when the selected optical axis position adjustment amount is "one pixel in the left direction", it is possible to generate an imaging signal in which the optical axis position is moved by one pixel in the left direction. When the next selected optical axis position adjustment amount is "one pixel in the upward direction", it is possible to generate an imaging signal in which the optical axis position is moved by one pixel in the upper left direction. When the next selected optical axis position adjustment amount is "one pixel in the right direction", it is possible to generate an imaging signal in which the optical axis position is moved by one pixel in the upward direction. Similarly, when the optical axis position adjustment amount is selected and the optical axis position is adjusted, an imaging signal in which the optical axis position is moved by one pixel in the upper right direction, an imaging signal in which the optical axis position is moved by one pixel in the right direction, an imaging signal in which the optical axis position is moved by one pixel in the lower right direction, an imaging signal in which the optical axis position is moved by one pixel in the downward direction, and an imaging signal in which the optical axis position is moved by one pixel in the lower left direction can be generated in order. Since the optical axis position adjustment amount is one pixel in any of the up/down and left/right directions, it is not necessary to move the optical axis position by an amount larger than one pixel.

The image processing unit 25 performs binning of the pixel signals of the same subject region as the subject region indicated by the pixel signals at the initial position using the imaging signals obtained sequentially for the pixels P1 to P4. For example, when the second imaging is performed and an imaging signal is generated, the image processing unit 25 performs binning of the pixel signal of the pixel P1 in the imaging signal generated by the first imaging and the pixel signal of the pixel P2 in the imaging signal generated by the second imaging and binning of the pixel signal of the pixel P3 in the imaging signal generated by the first imaging and the pixel signal of the pixel P4 in the imaging signal generated by the second imaging.

When the third imaging is performed and an imaging signal is generated, the image processing unit 25 performs binning of the pixel signal after binning of the pixel P1 and the pixel signal of the pixel P4 in the imaging signal generated by the third imaging.

When the fourth imaging is performed and an imaging signal is generated, the image processing unit 25 performs binning of the pixel signal after binning of the pixel P1 and the pixel signal of the pixel P3 in the imaging signal generated by the fourth imaging and binning of the pixel signal of the pixel P2 in the imaging signal generated in the first imaging and the pixel signal of the pixel P4 in the imaging signal generated by the fourth imaging.

When the fifth imaging is performed and an imaging signal is generated, the image processing unit 25 performs binning of the pixel signal after binning of the pixel P2 and the pixel signal of the pixel P3 in the imaging signal generated by the fifth imaging.

When the sixth imaging is performed and an imaging signal is generated, the image processing unit 25 performs binning of the pixel signal after binning of the pixel P2 and the pixel signal of the pixel P1 in the imaging signal generated by the sixth imaging and binning of the pixel signal of the pixel P4 in the imaging signal generated by the first imaging and the pixel signal of the pixel P3 in the imaging signal generated by the sixth imaging.

When the seventh imaging is performed and an imaging signal is generated, the image processing unit 25 performs binning of the pixel signal after binning of the pixel P4 and the pixel signal of the pixel P1 in the imaging signal generated by the seventh imaging.

When the eighth imaging is performed and an imaging signal is generated, the image processing unit 25 performs binning of the pixel signal after binning of the pixel P3 and the pixel signal of the pixel P1 in the imaging signal generated by the eighth imaging and binning of the pixel signal of after binning of the pixel P4 and the pixel signal of the pixel P2 in the imaging signal generated by the eighth imaging.

When the ninth imaging is performed and an imaging signal is generated, the image processing unit 25 performs binning of the pixel signal after binning of the pixel P3 and the pixel signal of the pixel P2 in the imaging signal generated by the ninth imaging.

The selection order of the optical axis position adjustment amounts shown in FIGS. 6A and 6B is an example, and the optical axis position adjustment amounts may be selected in the order opposite to that in FIG. 6A. In FIGS. 6A and 6B, the optical axis position is not limited to being moved from the initial position to the left, and may be moved to the right, up and down, or diagonally.

In this way, the control unit 26 causes the optical axis position adjustment unit 23 to move the optical axis position of the imaging optical system with respect to the imaging element that divides the exit pupil of the imaging optical system into a plurality of regions to generate a pixel signal for each region and causes the imaging element to generate pixel signals indicating the same subject region for each of the plurality of regions. The image processing unit 25 can obtain a high-resolution captured image by binning the plurality of pixel signals indicating the same subject region generated by the imaging element moving the optical axis position.

Figure 7A:
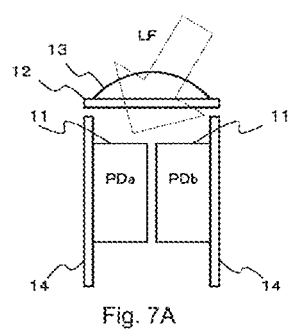
FIGS. 7A, 7B, and 7C are diagrams for explaining the effect.
Figure 7B:
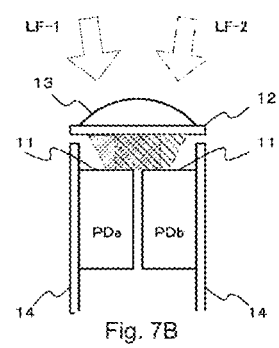
Figure 7C:
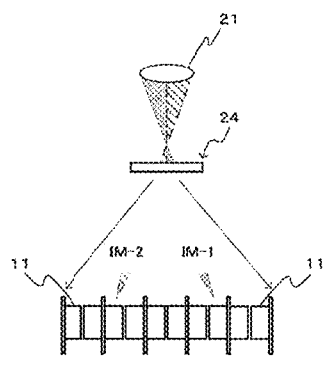

FIGS. 7A, 7B, and 7C are diagrams for explaining the effect. When the exit pupil of the imaging optical system is divided into a plurality of regions and a photoelectric conversion element is provided in each of the divided regions, as shown in FIG. 7A, if the incidence angel of a luminous flux LF from the imaging optical system is large, the amount of light incident on a photoelectric conversion element PDa and a photoelectric conversion element PDb is biased depending on the incidence angle. As described above, when the amount of light is biased between the photoelectric conversion element PDa and the photoelectric conversion element PDb, a sensitivity difference (referred to as "inter-same-color sensitivity difference") occurs within the pixels of the same color. As shown in FIG. 7B, the luminous fluxes LF-1 and LF-2 in the regions where the exit pupil is divided are incident on both pupil images of the photoelectric conversion element PDa and the photoelectric conversion element PDb, blurring (referred to as "inter-same-color mixing") or the like occurs. Therefore, in the conventional imaging device, the influence of inter-same-color sensitivity difference, inter-same-color mixing, and the like is reduced by performing binning using the pixel signal of the pixels located under the on-chip lens, that is, binning in the spatial direction. However, since binning is performed in the spatial direction, the spatial resolution is lowered and a high-resolution captured image may not be acquired.

As shown in FIG. 7C, when a focus shift occurs, since a first image IM-1 and a second image LM-2 corresponding to the pupil-divided regions are at different positions of a 2×2 pixel region, if binning of pixel signals of the pixels located below the on-chip lens is performed, the image may be corrupted.

However, according to the present technology, the optical axis position of the imaging optical system with respect to the imaging element is moved sequentially to generate the pixel signals indicating the same subject region using pixels at different positions, and binning of pixel signals indicating the same subject region is performed. Therefore, it is possible to acquire a high-resolution captured image with little inter-same-color sensitivity difference and inter-same-color mixing. Since the pixel signals indicating the same subject region are binned, it is possible to reduce image corruption even when a focus shift occurs.

Figure 8A:
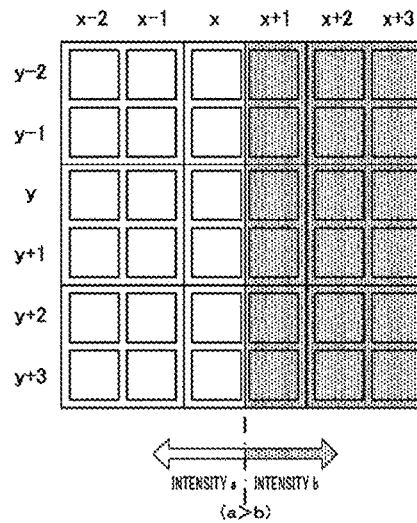
FIGS. 8A, 8B, and 8C are diagrams showing an operation when the incident light has a region of intensity a and a region of intensity b.
Figure 8B:
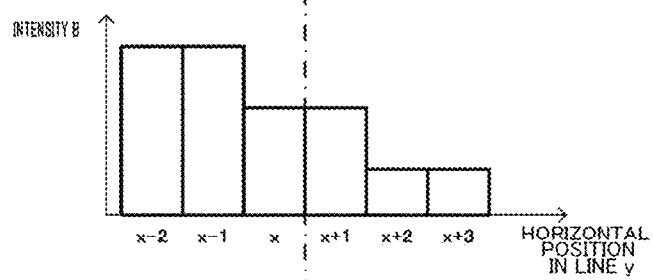
Figure 8C:
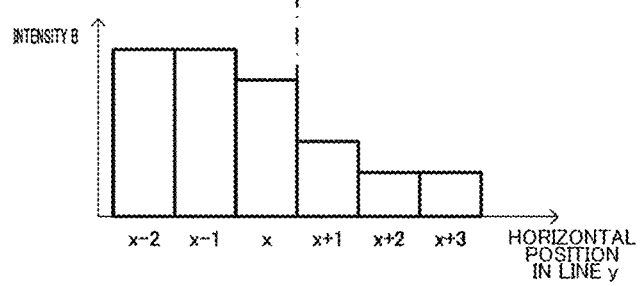

Next, the operation when the incident light has a region of intensity a and a region of intensity b will be described with reference to FIGS. 8A, 8B, and 8C FIG. 8A shows the relationship between a pixel position and a region where the incident light has the intensity a, and a region where the incident light has the intensity b.

When binning is performed in the spatial direction for a 2×2 pixel region as in the conventional case, the intensity Bx−1,y at the pixel position (x−1,y), the intensity Bx,y at the pixel position (x,y), the intensity Bx+1,y at the pixel position (x+1,y), and the intensity Bx+2,y at the pixel position (x+2,y) have the values of Equations (1), (2), (3), and (4), respectively. FIG. 8B shows the relationship between the pixel position and the pixel value when binning is performed in the spatial direction.

$$Bx-1,y=(4\times a)/4 \qquad (1)$$

$$Bx,y=(2\times a+2\times b)/4 \qquad (2)$$

$$Bx+1,y=(2\times a+2\times b)/4 \qquad (3)$$

$$Bx+2,y=(4\times b)/4 \qquad (4)$$

When binning is performed in the time direction as in the present technology, the relationship of Equation (5) is established using the observed values I1 to I4 of the pixel values of the pixels P1 to P4 constituting the 2×2 pixel region, the true values U1 to U4 of the observed values I1 to I4, and the parameters β0 to β15 indicating the influence of inter-same-color sensitivity difference and inter-same-color mixing. Therefore, the intensity Bx,y at the pixel position (x−1,y), the intensity Bx,y at the pixel position (x,y), the intensity Bx+1,y at the pixel position (x+1,y), and the intensity Bx+2,y at the pixel position (x+2,y) can be calculated on the basis of Equations (6), (7), (8), and (9), respectively. FIG. 8C shows the relationship between the pixel position and the pixel value when the present technology is used.

[Math 1]

$$\begin{bmatrix} \beta_0 & \beta_1 & \beta_2 & \beta_3 \\ \beta_4 & \beta_5 & \beta_6 & \beta_7 \\ \beta_8 & \beta_9 & \beta_{10} & \beta_{11} \\ \beta_{12} & \beta_{13} & \beta_{14} & \beta_{15} \end{bmatrix} \begin{bmatrix} I_1 \\ I_2 \\ I_3 \\ I_4 \end{bmatrix} = \begin{bmatrix} u_1 \\ u_2 \\ u_3 \\ u_4 \end{bmatrix} \qquad (5)$$

$$B_{x-1,y} = [\beta_0 \ \beta_1 \ \beta_2 \ \beta_3]\begin{bmatrix} a \\ a \\ a \\ a \end{bmatrix} + [\beta_4 \ \beta_5 \ \beta_6 \ \beta_7]\begin{bmatrix} a \\ a \\ a \\ a \end{bmatrix} + \qquad (6)$$

$$[\beta_8 \ \beta_9 \ \beta_{10} \ \beta_{11}]\begin{bmatrix} a \\ a \\ a \\ a \end{bmatrix} + [\beta_{12} \ \beta_{13} \ \beta_{14} \ \beta_{15}]\begin{bmatrix} a \\ a \\ a \\ a \end{bmatrix}$$

$$B_{x,y} = [\beta_0 \ \beta_1 \ \beta_2 \ \beta_3]\begin{bmatrix} a \\ b \\ a \\ b \end{bmatrix} + [\beta_4 \ \beta_5 \ \beta_6 \ \beta_7]\begin{bmatrix} a \\ a \\ a \\ a \end{bmatrix} + \qquad (7)$$

$$[\beta_8 \ \beta_9 \ \beta_{10} \ \beta_{11}] \begin{bmatrix} a \\ b \\ a \\ b \end{bmatrix} + [\beta_{12} \ \beta_{13} \ \beta_{14} \ \beta_{15}] \begin{bmatrix} a \\ a \\ a \\ a \end{bmatrix}$$

$$B_{x+1,y} = [\beta_0 \ \beta_1 \ \beta_2 \ \beta_3] \begin{bmatrix} b \\ b \\ b \\ b \end{bmatrix} + [\beta_4 \ \beta_5 \ \beta_6 \ \beta_7] \begin{bmatrix} a \\ b \\ a \\ b \end{bmatrix} + \quad (8)$$

$$[\beta_8 \ \beta_9 \ \beta_{10} \ \beta_{11}] \begin{bmatrix} b \\ b \\ b \\ b \end{bmatrix} + [\beta_{12} \ \beta_{13} \ \beta_{14} \ \beta_{15}] \begin{bmatrix} a \\ b \\ a \\ b \end{bmatrix}$$

$$B_{x+2,y} = [\beta_0 \ \beta_1 \ \beta_2 \ \beta_3] \begin{bmatrix} b \\ b \\ b \\ b \end{bmatrix} + [\beta_4 \ \beta_5 \ \beta_6 \ \beta_7] \begin{bmatrix} b \\ b \\ b \\ b \end{bmatrix} + \quad (9)$$

$$[\beta_8 \ \beta_9 \ \beta_{10} \ \beta_{11}] \begin{bmatrix} b \\ b \\ b \\ b \end{bmatrix} + [\beta_{12} \ \beta_{13} \ \beta_{14} \ \beta_{15}] \begin{bmatrix} b \\ b \\ b \\ b \end{bmatrix}$$

That is, in FIG. 8B, the intensity B is equal at the horizontal position x and the horizontal position x+1. However, in FIG. 8C, the intensity B is different between the horizontal position x and the horizontal position x+1, so that a captured image having a higher resolution than the conventional technology is obtained.

Figure 9A:
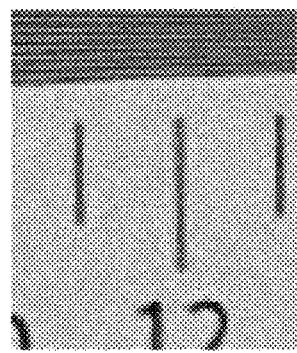
FIGS. 9A and 9B are diagrams showing a captured image acquired by an imaging device.
Figure 9B:
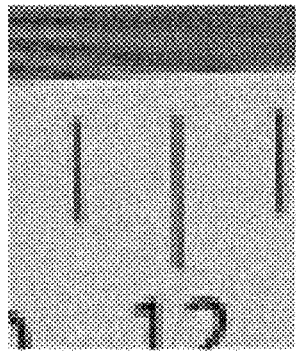

FIGS. 9A and 9B shows a captured image acquired by the imaging device. FIG. 9A shows an image captured by the imaging device of the present technology, and FIG. 9B shows an image captured by a conventional imaging device that performs binning only in the spatial direction. According to the present technology, it is possible to distinguish lines in the wedge-shaped resolution chart portion shown at the top, but with the conventional technique, the image is crushed and the lines cannot be distinguished. According to the present technology, a portion of the number "12" is displayed in high resolution, but the number is blurred in the conventional technique. That is, using the technique of the present disclosure, a high-resolution captured image is obtained.

3. Second Embodiment

In the second embodiment, a case where the imaging device is portable or is fixed to an object or the like to cause movement will be described.

3-1. Configuration of Second Embodiment

Figure 10:
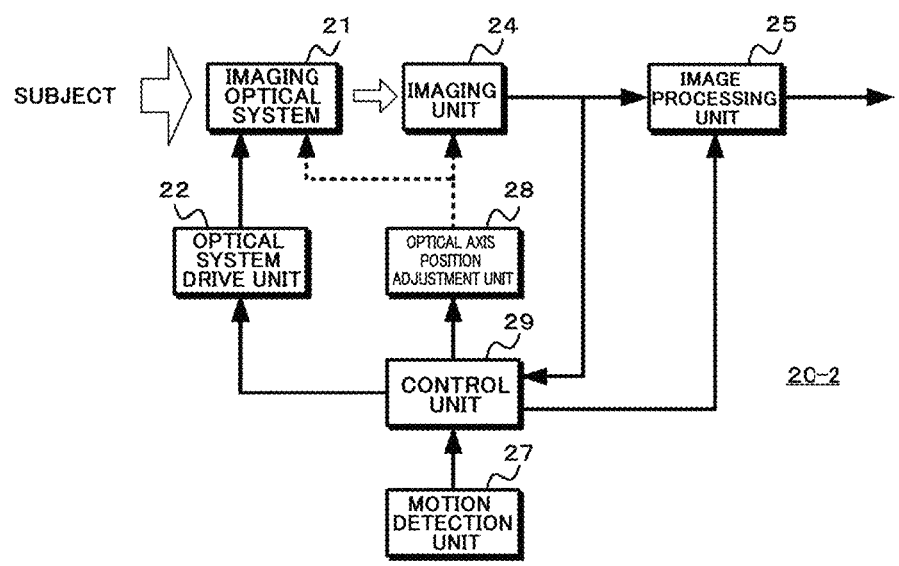
FIG. 10 is a diagram showing a configuration of a second embodiment.

FIG. 10 shows a configuration of the second embodiment. An imaging device 20-2 has an imaging optical system 21, an optical system drive unit 22, an imaging unit 24, and an image processing unit 25, similarly to the imaging device 20-1. The imaging device 20-2 is provided with a motion detection unit 27, an optical axis position adjustment unit 28, and a control unit 29.

The imaging optical system 21 is configured using a focus lens, a zoom lens, or the like. The imaging optical system 21 drives a focus lens, a zoom lens, or the like on the basis of a drive signal from the optical system drive unit 22, and forms a subject optical image on the imaging surface of the imaging unit 24. The imaging optical system 21 may be provided with an iris (aperture) mechanism, a shutter mechanism, or the like, and may be configured to drive each mechanism on the basis of a drive signal from the optical system drive unit 22. The imaging optical system 21 may be detachable or fixed.

The optical system drive unit 22 generates a drive signal on the basis of the focus control signal and the zoom control signal supplied from the control unit 26 and outputs the drive signal to the imaging optical system 21 to perform a focus lens driving operation of focusing on a desired subject and a zoom lens driving operation so that a captured image with a desired angle of view is obtained.

The imaging unit 24 is configured using an imaging element such as a complementary metal oxide semiconductor (CMOS) or a charge coupled device (CCD). The imaging device has the configuration shown in FIGS. 1A and 1B, and generates an imaging signal and outputs the imaging signal to the image processing unit 25 and the control unit 29.

The image processing unit 25 discriminates pixel signals indicating the same subject region from the imaging signals generated in chronological order by the imaging unit 24 on the basis of an identification signal from the control unit 26, performs binning of the pixel signals indicating the same subject region for each pixel, and outputs an image signal of the captured image composed of the pixel signals after binning.

The motion detection unit 27 is configured using a gyro sensor, an acceleration sensor, or the like, and detects the movement of the main body of the imaging device 20-2 provided with the imaging unit 24. The motion detection unit 27 outputs a motion detection signal indicating the motion detection result to the control unit 29.

The optical axis position adjustment unit 28 is configured using an optical shake correction mechanism, and adjust the position of the optical axis of the imaging optical system 21 with respect to the imaging unit 24 on the basis of an optical axis position adjustment signal from the control unit 29. For example, the optical axis position adjustment unit 28 moves a shake correction lens provided in the imaging optical system 21 on the basis of the optical axis position adjustment signal, or moves the imaging element of the imaging unit 24 in a direction orthogonal to the optical axis on the basis of the optical axis position adjustment signal to correct the blurring of the captured image due to the movement of the main body of the imaging element 20-2. The optical axis position adjustment unit 28 adjusts the position of the optical axis of the imaging optical system 21 with respect to the imaging unit 24 on the basis of the optical axis position adjustment signal so that the imaging element can generate pixel signals indicating the same subject region for each of a plurality of regions obtained by dividing the exit pupil of the imaging optical system 21.

The control unit 29 calculates the defocus amount on the basis of the imaging signal generated by the imaging unit 24. The control unit 29 generates a focus control signal so that the defocus amount is minimized on the basis of the calculated defocus amount, and outputs the focus control signal to the optical system drive unit 22 to perform focus control so that a desired subject is in focus.

The control unit 29 calculates the optical axis position adjustment amount for correcting the blurring of the captured image due to the movement of the main body of the imaging device 20-2 on the basis of the motion detection signal from the motion detection unit 27. The control unit 29 integrates the optical axis position adjustment amount for correcting the blurring and the optical axis position adjustment amount for generating the pixel signals indicating the same subject region are generated by all the pixels or a plurality of pixels corresponding to the divided regions obtained by dividing the exit pupil of the imaging optical system 21. The control unit 29 outputs an optical axis position adjustment signal indicating the integrated optical axis position adjustment amount to the optical axis position adjustment unit 28 so that the optical axis position of the imaging optical system 21 with respect to the imaging element is adjusted. The control unit 26 controls the imaging unit 24 to generate an imaging signal every time the optical axis position adjustment for generating pixel signals indicating the same subject region is performed. The control unit 26 outputs an identification signal to the image processing unit 25, which makes it possible to determine whether the pixel signals indicating the same subject region are generated in any one of the pixels corresponding to the pupil-divided regions.

3-2. Operation of Second Embodiment

Figure 11:
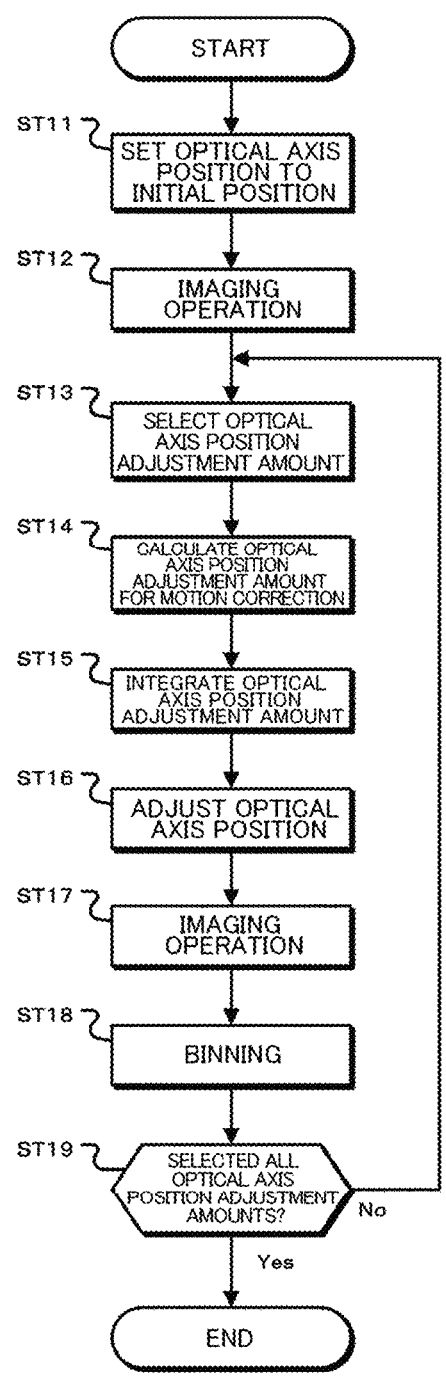
FIG. 11 is a flowchart showing an operation of the second embodiment.

FIG. 11 is a flowchart showing the operation of the second embodiment. FIG. 11 shows an operation in a state where focus control is performed on the basis of an imaging signal generated by the imaging unit 24 and a desired subject is in focus.

In step ST11, the imaging device sets the optical axis position to an initial position. The control unit 29 of the imaging device 20-2 sets the optical axis position to the initial position with the aid of the optical axis position adjustment unit 28, and proceeds to step ST12.

In step ST12, the imaging device performs an imaging operation. The control unit 29 of the imaging device 20-2 controls the imaging unit 24 to perform an imaging operation and output an imaging signal when the optical axis position is the initial position to the image processing unit 25, and proceeds to step ST13.

In step ST13, the imaging device selects an optical axis position adjustment amount. The control unit 29 of the imaging device 20-2 selects an optical axis position adjustment amount that has not been selected from a plurality of preset optical axis position adjustment amounts, or selects an optical axis position adjustment amount in a specified order, and proceeds to step ST14.

In step ST14, the imaging device calculates an optical axis position adjustment amount for motion correction. The motion detection unit 27 of the imaging device 20-2 detects the movement of the main body of the imaging device 20-2 from the initial position. The control unit 29 calculates an optical axis position adjustment amount for correcting the blurring of the captured image due to the movement of the main body of the imaging device 20-2 on the basis of the motion detection signal indicating the motion detection result from the motion detection unit 27, and proceeds to step ST15.

In step ST15, the imaging device integrates the optical axis position adjustment amounts. The control unit 29 of the imaging device 20-2 integrates the optical axis position adjustment amount selected in step ST13 and the optical axis position adjustment amount calculated in step ST14, and proceeds to step ST16.

In step ST16, the imaging device adjusts the optical axis position. The control unit 29 of the imaging device 20-2 moves the optical axis position of the imaging unit 24 with respect to the imaging element with the aid of the optical axis position adjustment unit 28 on the basis of the optical axis position adjustment amount integrated in step ST15, and proceeds to step ST17.

In step ST17, the imaging device performs an imaging operation. After the optical axis position adjustment in step ST16 is completed, the control unit 29 of the imaging device 20-2 controls the imaging unit 24 to perform the imaging operation and output the imaging signal generated by the imaging unit 24 to the image processing unit 25, and proceeds to step ST18.

In step ST18, the imaging device performs binning. The control unit 29 of the imaging device 20-2 outputs an identification signal to the image processing unit 25, the identification signal making it possible to determine whether the pixel signals indicating the same subject region are generated in any one of the pixels corresponding to the pupil-divided regions with respect to the imaging signal when the optical axis position is the initial position. The image processing unit 25 performs binning of the pixel signals indicating the same subject region for each pixel on the basis of the identification signal from the control unit 29 using the imaging signal generated in step ST17 or the imaging signal already generated or the imaging signal generated in the previous binning, and proceeds to step ST19.

In step ST19, the imaging device determines whether all the optical axis position adjustment amounts have been selected. The control unit 29 of the imaging device 20-2 ends the process when all of the plurality of preset optical axis position adjustment amounts are selected, and returns to step ST13 when there is an unselected optical axis position adjustment amount.

When such processing is performed, the same processing and operation as in the first embodiment can be performed without being affected by the movement of the imaging device, and a high-resolution captured image can be acquired.

4. Other Embodiments

By the way, in the above-mentioned image processing unit, binning of pixel signals indicating the same subject region in the time direction is performed for each pixel to generate an image signal, but the pixel signals after binning in the time direction may be selectively used depending on the subject.

For example, the image processing unit 25 discriminates the subject on the basis of the imaging signal generated by the imaging unit 24, and discriminates a flat portion or a moving subject. When it is determined that the pixel block is a flat region, the image processing unit 25 performs binning in the spatial direction using the pixel signals in the pixel block and uses the pixel signals after binning in the spatial direction as the pixel signal in the pixel block. As described above, in the flat region, using the pixel signals after binning in the spatial direction, it is possible to prevent the pixel values from fluctuating within the pixel block. When it is determined that the pixel block is not a moving subject, the image processing unit 25 uses the pixel signals generated by binning in the time direction using a plurality of pixel signals indicating the same subject region. In a moving subject, when a plurality of imaging signals are generated in chronological order, the position of the subject may move and the relationship shown in FIGS. 5A and 5B may not be established. Therefore, using the pixel signals generated by binning in the time direction when it is determined that the subject is not a moving subject, it is possible to prevent the image from being corrupted.

In the above-described embodiment, the case where the exit pupil of the imaging optical system is divided into pixel block regions of 2×2 pixels is shown, but the pixel block may be composed of a plurality of pixels. For example, the pixel block may be composed of 2×1 pixels and may have more pixels than 2×2 pixels. The color filter is not limited to the Bayer arrangement and may be another color arrangement, and may be a complementary color system without being limited to the primary color system.

5. Application Examples

The technology according to the present disclosure can be applied to various fields. For example, the technique according to the present disclosure may be realized as an imaging device mounted on any type of moving body such as an automobile, an electric vehicle, a hybrid electric vehicle, a motorcycle, a bicycle, a personal mobility, an airplane, a drone, a ship, and a robot. Further, the technology may be realized as an imaging device mounted in equipment that is used in a production process in a factory or equipment that is used in a construction field. When applied to such a field, a high-resolution captured image focused on a desired subject can be acquired, so that the surrounding situation can be grasped accurately, and for example, automatic driving can be performed more safely.

Further, the technology according to the present disclosure can also be applied to the medical field. For example, when applied to the case where the captured image of the surgical site is used when performing the operation, a high-resolution image can be obtained, and the operation can be performed safely and more reliably.

When the technology according to the present disclosure is applied to the monitoring field, a high-resolution monitoring image can be obtained, and the monitoring accuracy can be improved.

The series of processing described in the specification can be executed by hardware, software, or a composite configuration of both. When the processing is executed by software, a program in which a processing sequence has been recorded is installed in a memory in a computer embedded in dedicated hardware and executed. Alternatively, the program can be installed in a general-purpose computer capable of executing various types of processing and executed.

For example, the program can be recorded in advance on a hard disk, a solid state drive (SSD), or a read only memory (ROM) as a recording medium. Alternatively, the program can be temporarily or permanently stored (recorded) in a removable recording medium such as a flexible disc, a compact disc read only memory (CD-ROM), a magneto optical (MO) disc, a digital versatile disc (DVD), a Blu-ray disc (BD) (registered trademark), a magnetic disk, or a semiconductor memory card. The removable recording medium can be provided as so-called package software.

Further, the program may be transferred from a download site to the computer wirelessly or by wire via a network such as a local area network (LAN) or the Internet, in addition to being installed in the computer from the removable recording medium. The computer can receive the program transferred in this way and install the program in a recording medium such as a built-in hard disk.

The effects described in the present specification are merely examples and are not limited, and there may be additional effects not described. Further, the present technology should not be construed as being limited to the embodiments of the technology described above. The embodiments of the present technology disclose the present technology in the form of examples, and it is obvious that a person skilled in the art can modify or substitute the embodiments without departing from the gist of the present technique. That is, claims should be taken into consideration in order to determine the gist of the present technology.

Further, the imaging control device of the present technology can also have the following configurations.

(1) An imaging control device including: a control unit that causes an optical axis position adjustment unit to move an optical axis position of an imaging optical system with respect to an imaging element that divides an exit pupil of the imaging optical system into a plurality of regions to generate a pixel signal for each region to cause the imaging element to generate pixel signals indicating the same subject region for each of the plurality of regions; and an image processing unit that performs binning of a plurality of pixel signals indicating the same subject region generated by the imaging element moving the optical axis position.

(2) The imaging control device according to (1), wherein the imaging device is configured using a color filter having a predetermined color pattern, and the plurality of pupil-divided regions has the same color.

(3) The imaging control device according to (1) or (2), wherein the imaging element divides the exit pupil into 2×2 regions, and the control unit causes the optical axis position adjustment unit to move the optical axis position in pixel units and causes the imaging element to generate pixel signals indicating the same subject region for each of the 2×2 regions.

(4) The imaging control device according to (3), wherein the control unit causes the optical axis position adjustment unit to move the optical axis position with respect to an initial position by one pixel in up/down and left/right directions and four diagonal directions and causes the imaging element to generate a pixel signal for each of the initial position and the positions in the eight movement directions, and the image processing unit performs binning of a plurality of pixel signals indicating the same subject region for each of the pupil-divided regions.

(5) The imaging control device according to (4), wherein the control unit causes the optical axis position adjustment unit to move the optical axis position in units of one pixel and causes the imaging element to generate a pixel signal for each of the positions in the eight movement directions.

(6) The imaging control device according to any one of (1) to (5), wherein the control unit controls the optical axis position adjusting unit on the basis of movement of an imaging device body having the imaging element detected by a motion detecting unit to correct blurring of a captured image.

(7) The imaging control device according to any one of (1) to (6), wherein the image processing unit discriminates a flat region using the pixel signals generated by the imaging element, and a pixel signal generated by binning the pixel signals of the pupil-divided regions is used in the flat region.

(8) The imaging control device according to any one of (1) to (7), wherein the image processing unit discriminates a moving subject using the pixel signals generated by the imaging element, and a pixel signal generated by binning a plurality of pixel signals indicating the same subject region is used in a region determined to be not the moving subject.

(9) The imaging control device according to any one of (1) to (8), wherein the control unit causes the optical axis position adjustment unit to move the imaging element in a direction orthogonal to the optical axis, or causes the optical axis position adjustment unit to drive a shake correction lens to adjust the optical axis position.

REFERENCE SIGNS LIST

10 Imaging element
11 Pixel

12 Color filter
13 On-chip lens
14 Separation layer
20-1, 20-2 Imaging device
21 Imaging optical system
22 Optical system drive unit
23, 28 Optical axis position adjustment unit
24 Imaging unit
25 Image processing unit
26, 29 Control unit
27 Motion detection unit

The invention claimed is:

1. An imaging control device, comprising:
a control unit configured to cause an optical axis position adjustment unit to move an optical axis position of an imaging optical system with respect to an imaging element that divides an exit pupil of the imaging optical system into a plurality of regions to generate a pixel signal for each region to cause the imaging element to generate pixel signals indicating a same subject region for each of the plurality of regions; and
an image processing unit configured to perform binning of a plurality of pixel signals indicating the same subject region generated by the imaging element moving the optical axis position.

2. The imaging control device according to claim 1, wherein the imaging element is configured using a color filter having a specific color pattern, and a plurality of pupil-divided regions has a same color.

3. The imaging control device according to claim 1, wherein
the imaging element divides the exit pupil into 2×2 regions, and
the control unit is further configured to cause the optical axis position adjustment unit to move the optical axis position in pixel units and cause the imaging element to generate pixel signals indicating the same subject region for each of the 2×2 regions.

4. The imaging control device according to claim 3, wherein
the control unit is further configured to cause the optical axis position adjustment unit to move the optical axis position with respect to an initial position by one pixel in up/down and left/right directions and four diagonal directions and cause the imaging element to generate a pixel signal for each of the initial position and positions in the eight movement directions, and
the image processing unit is further configured to perform the binning of the plurality of pixel signals indicating the same subject region for each of a plurality of pupil-divided regions.

5. The imaging control device according to claim 4, wherein the control unit is further configured to cause the optical axis position adjustment unit to move the optical axis position in units of one pixel and cause the imaging element to generate a pixel signal for each of the positions in the eight movement directions.

6. The imaging control device according to claim 1, wherein the control unit is further configured to control the optical axis position adjusting unit based on movement of an imaging device body having the imaging element detected by a motion detecting unit to correct blurring of a captured image.

7. The imaging control device according to claim 1, wherein
the image processing unit is further configured to discriminate a flat region based on the pixel signals generated by the imaging element, and
a pixel signal generated by binning the pixel signals of a plurality of pupil-divided regions is used in the flat region.

8. The imaging control device according to claim 1, wherein the image processing unit is further configured to discriminate a moving subject using the pixel signals generated by the imaging element, and a pixel signal generated by binning the plurality of pixel signals indicating the same subject region is used in a region determined to be not the moving subject.

9. The imaging control device according to claim 1, wherein the control unit is further configured to cause the optical axis position adjustment unit to move the imaging element in a direction orthogonal to the optical axis, or cause the optical axis position adjustment unit to drive a shake correction lens to adjust the optical axis position.

10. An imaging control method, comprising:
allowing a control unit to cause an optical axis position adjustment unit to move an optical axis position of an imaging optical system with respect to an imaging element that divides an exit pupil of the imaging optical system into a plurality of regions to generate a pixel signal for each region to cause the imaging element to generate pixel signals indicating the same subject region for each of the plurality of regions; and
allowing an image processing unit to perform binning of a plurality of pixel signals indicating the same subject region generated moving the optical axis position.

11. A non-transitory computer-readable medium having stored thereon, computer-executable instructions that when executed by a computer, causes the computer to execute operations for imaging control using an imaging element that divides an exit pupil of an imaging optical system into a plurality of regions to generate a pixel signal for each region, the operations comprising:
causing an optical axis position adjustment unit to move an optical axis position of the imaging optical system with respect to the imaging element and causing the imaging element to generate pixel signals indicating a same subject region for each of the plurality of regions; and
performing binning of a plurality of pixel signals indicating the same subject region generated by moving the optical axis position.

12. An imaging device, comprising:
an imaging element configured to divide an exit pupil of an imaging optical system into a plurality of regions to generate a pixel signal for each of the plurality of regions;
an optical axis position adjustment unit configured to adjust an optical axis position of the imaging optical system with respect to the imaging element;
a control unit configured to cause the optical axis position adjustment unit to move the optical axis position and cause the imaging element to generate pixel signals indicating a same subject region for each of the plurality of regions; and
an image processing unit configured to perform binning of a plurality of pixel signals indicating the same subject region generated by moving the optical axis position.

* * * * *